(12) United States Patent
Funk et al.

(10) Patent No.: US 12,416,497 B1
(45) Date of Patent: Sep. 16, 2025

(54) MAPPING APPARATUS AND METHOD

(71) Applicant: 5D Solutions, Inc., Huntsville, AL (US)

(72) Inventors: Peter L. Funk, Huntsville, AL (US); Brian A. Keyser, Huntsville, AL (US); Lawrence J. Donelson, Jr., Huntsville, AL (US)

(73) Assignee: InTerra, Inc., Huntsville, AL (US)

( * ) Notice: Subject to any disclaimer, the term of this patent is extended or adjusted under 35 U.S.C. 154(b) by 186 days.

(21) Appl. No.: 17/683,596

(22) Filed: Mar. 1, 2022

Related U.S. Application Data

(60) Provisional application No. 63/155,775, filed on Mar. 3, 2021.

(51) Int. Cl.
*G01C 11/02* (2006.01)
*G01C 11/04* (2006.01)

(52) U.S. Cl.
CPC .............. *G01C 11/02* (2013.01); *G01C 11/04* (2013.01)

(58) Field of Classification Search
CPC ................................ G01C 11/02; G01C 11/04
See application file for complete search history.

(56) References Cited

U.S. PATENT DOCUMENTS

| 9,541,641 | B2* | 1/2017 | Stolarczyk | G01S 13/89 |
|---|---|---|---|---|
| 9,716,813 | B2* | 7/2017 | Han | F16M 11/00 |
| 2017/0122736 | A1* | 5/2017 | Dold | G01C 15/006 |
| 2019/0129064 | A1* | 5/2019 | Martin | G01V 15/00 |
| 2020/0117201 | A1* | 4/2020 | Oetken | G05D 1/0231 |

* cited by examiner

*Primary Examiner* — Tung S Lau

(57) ABSTRACT

The instant application provides a system comprising at least one or more receiver units and one or more targets which work in conjunction with a users' existing aerial drone to improve the accuracy of photogrammetric data collection.

9 Claims, 5 Drawing Sheets

MAPPING APPARATUS AND METHOD

CROSS REFERENCE TO RELATED APPLICATIONS

This application claims the benefit of, and priority to, U.S. Provisional Patent Application No. 63/155,775, filed on Mar. 3, 2021, titled "Mapping Apparatus and Method."

FIELD OF THE DISCLOSURE

The present invention is directed to a system and method for obtaining accurate topographic surveying position data, such as photogrammetric data, quickly and in a cost-effective manner. Further, the present invention allows the quick and easy use of the data obtained by a receiver during a survey.

BACKGROUND

Aerial mapping using drones is well known in the art. However, the current solutions do not provide cost-efficient technologies that produce easy to use and manipulate data files. For example, some of the Global Navigation Satellite System (GNSS)/Global Positioning System (GPS) receivers on the market today cost upwards of $20,000 each, and multiple receivers may be needed to complete one mapping project. The present system detailed herein solves the issues associated with the prior art solutions.

BRIEF DESCRIPTION OF THE DRAWINGS

To further illustrate the advantages and features of the present disclosure, a more particular description of the invention will be rendered by reference to specific embodiments thereof which are illustrated in the appended drawings. It is appreciated that these drawings are not to be considered limiting in scope. The invention will be described and explained with additional specificity and detail through the use of the accompanying drawings in which.

DETAILED DESCRIPTION

Figure 1:
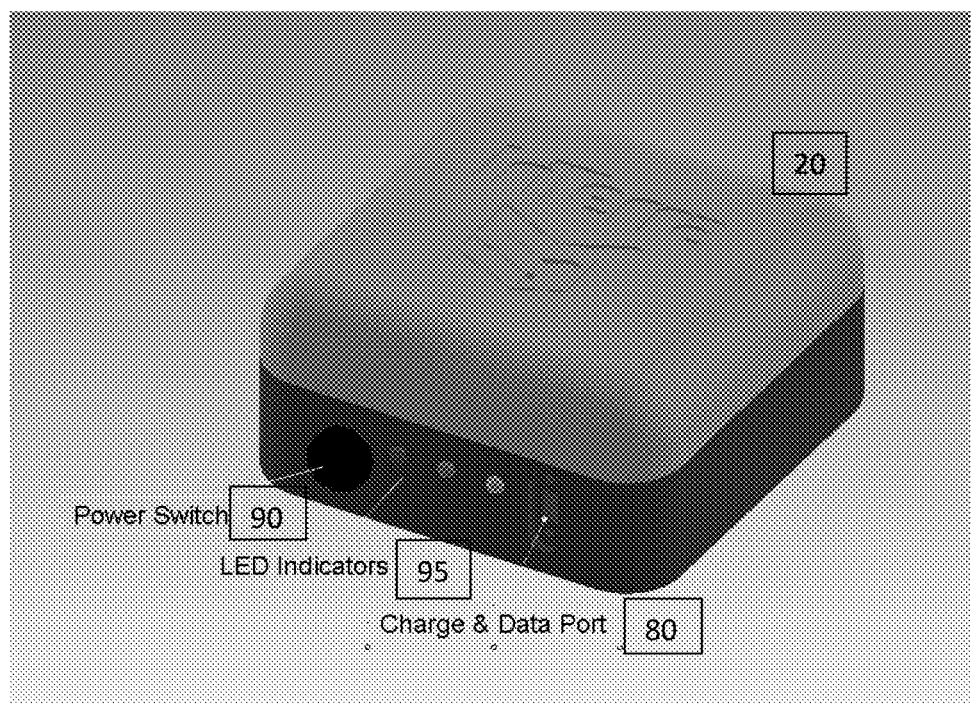
FIG. 1 shows one embodiment of a receiver unit described in the instant application.
Figure 2A:
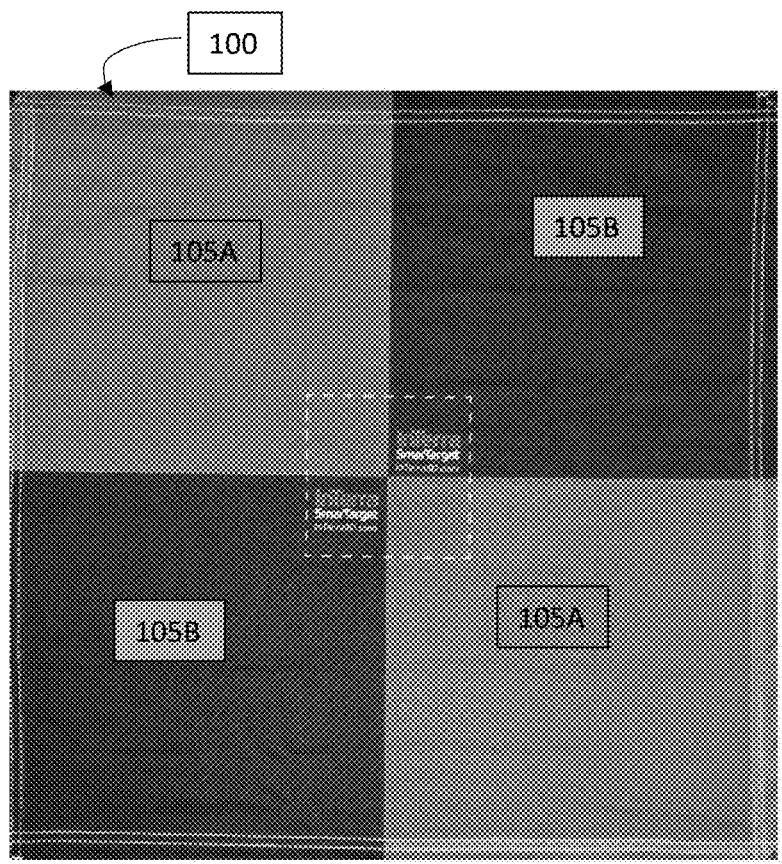
FIGS. 2A and 2B show various alternate embodiments of the targets described in the instant application.
Figure 2B:
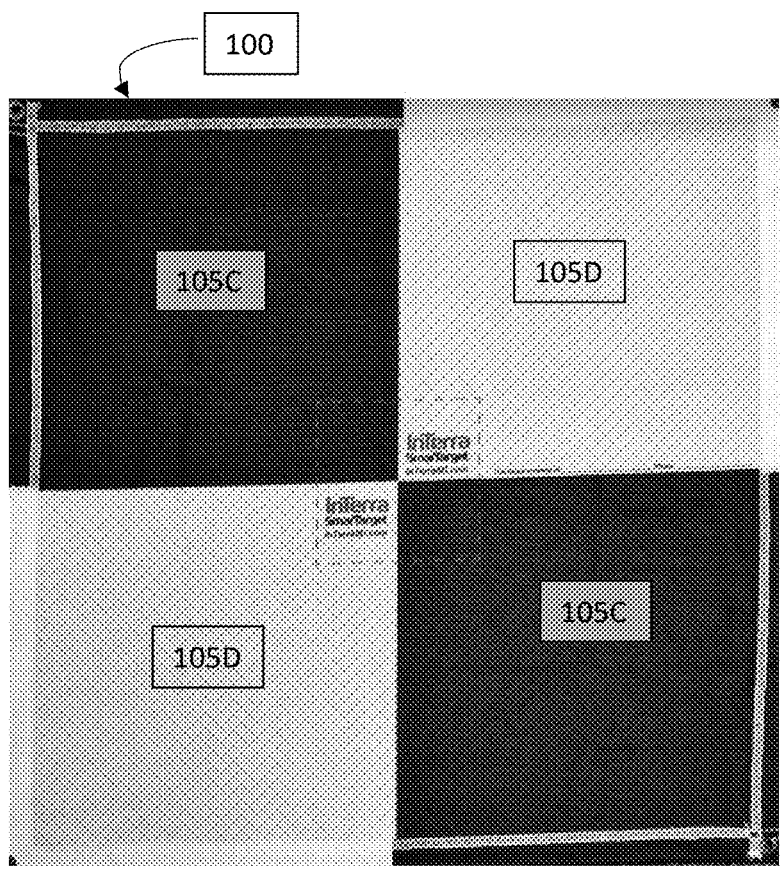
Figure 3:
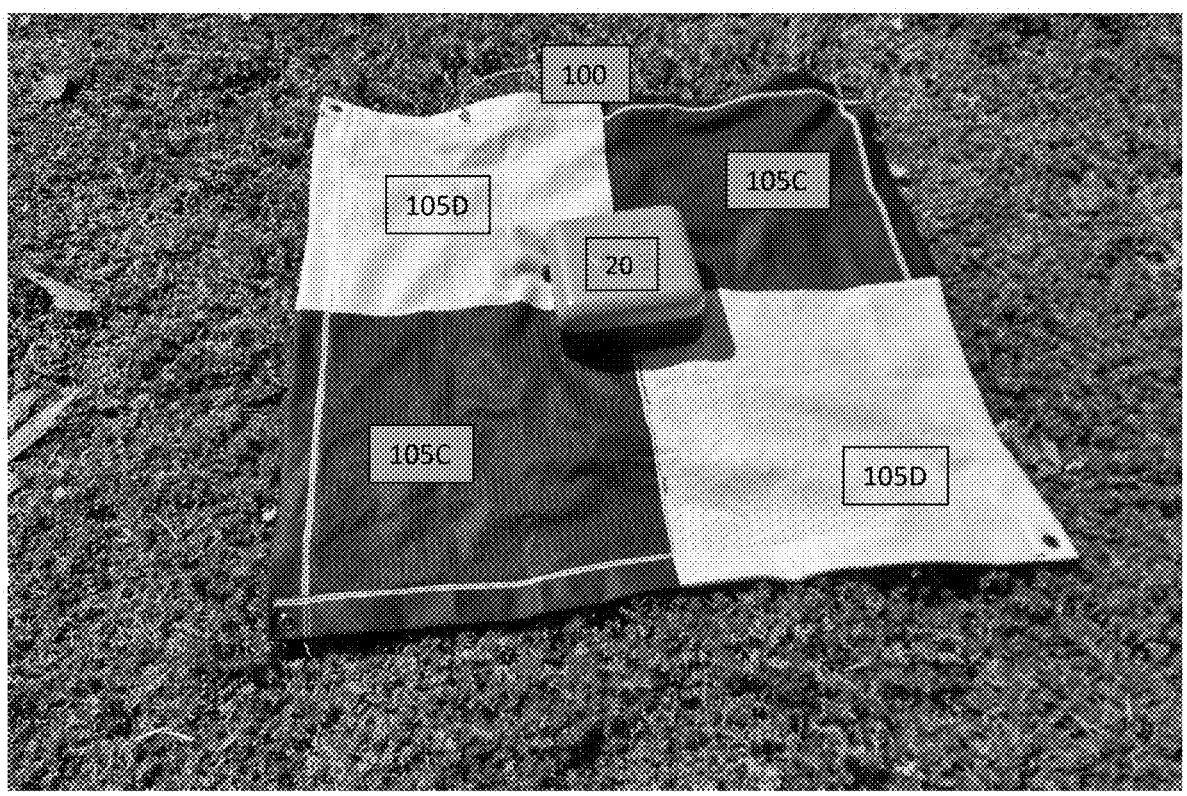
FIG. 3 shows one embodiment of placing a receiver unit on a target as described in the instant application.
Figure 4:
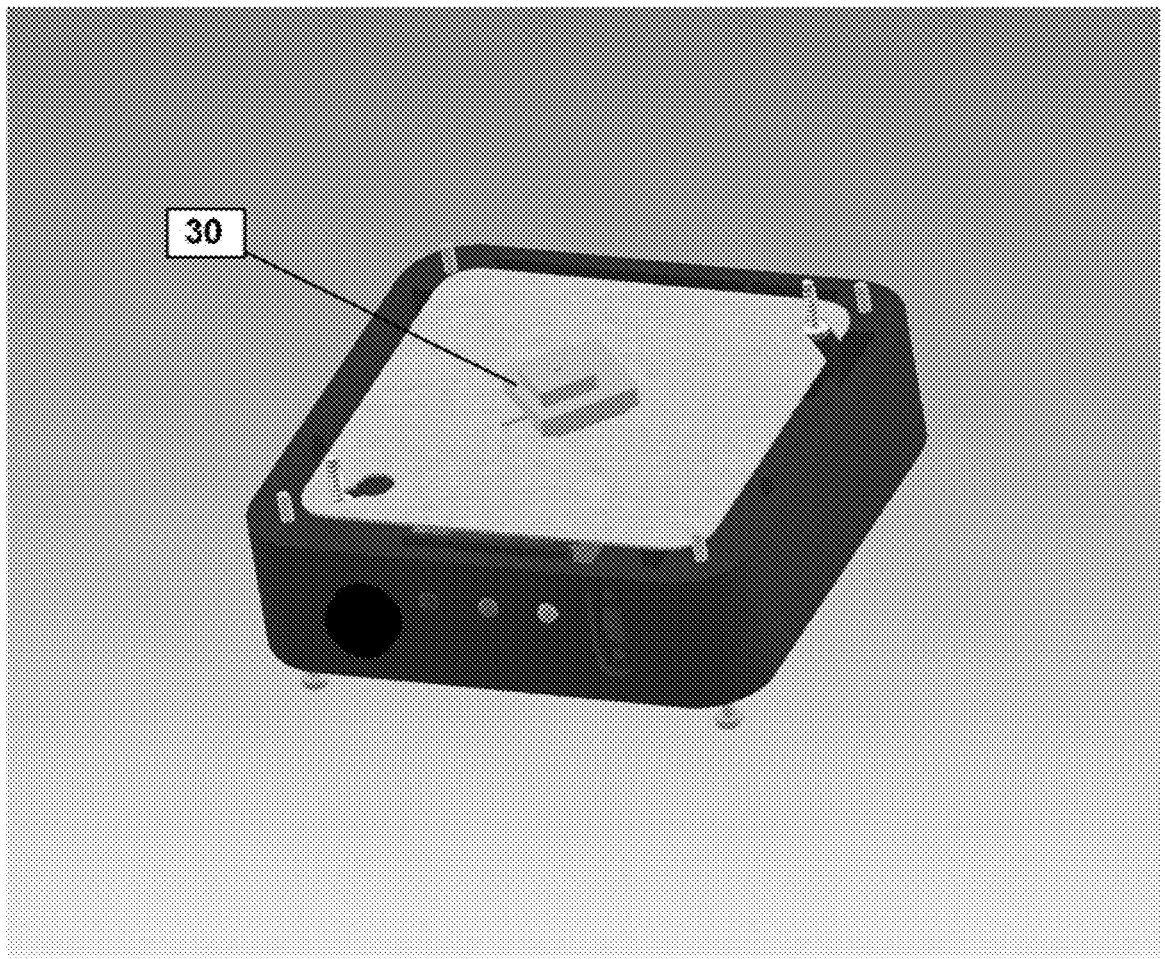

As shown in FIGS. 1-3, the present system 10 provides an apparatus and method of use to obtain accurate and easily usable survey data. The system 10 includes one or more receiver units 20 that are used as ground control points to work in conjunction with a users' existing aerial drone 110 to improve the accuracy of photogrammetric data collection. These receiver units 20 collect data from the GNSS/GPS system and use that data with correction data using established National Geodetic Service (NGS) Continuously Operating Reference System (CORS) data to post-process kinematic (PPK) solutions for improved accuracy using desktop powered software solution.

The receiver unit 20 is especially useful in providing surveying and mapping services and with aerial drones 110 during aerial photogrammetry. In one embodiment, the receiver unit 20 comprises a positioning antenna 30 attached to a ferrous metal grounding plate 25 which prevents multi-phase interference 40. In one embodiment, the positioning antenna 30 is a ZED-F9P multi-band GNSS/GPS manufactured by u-Blox Holding AG, although other positioning antennas 30 that are capable of similar functions should be considered within the scope of this disclosure. The receiver unit 20 is built of a single board designed to also include several other useful features such as a charging control module 50 to control the discharge of a battery 60, a secure digital (SD, or micro-SD) card reader 70, a battery charging port 80, and an on/off switch or button 90.

The system 10 also includes one or more ground targets 100 that are designed to be visible to the aerial drone 110 from the air. The targets 100 may optionally include a contrasting color scheme to make it easier to locate the target 100 from the air via the aerial drone's 110 camera 120 which is taking photographs of the property. In one embodiment, the target 100 comprises a first color 130 and a second color 140, which may be contrasting. In one embodiment, one side of the target 100 includes a different contrasting color scheme than the opposite side. The target 100 is manufactured of flexible materials to allow easy field conveyance, setup, and retrieval.

One exemplary use of the system 10 will be described below.

Initially, a user 150 would place multiple targets 100 about a property 160 to be aerial surveyed or mapped. Then a receiver unit 20 would be placed in the center of each target 100. The receiver units 20 collect position data via the positioning antenna 30 and store said data. It is known in the art the positioning data gathered by the receiver unit 20 may need to be corrected via some method. Then, once the areal drone 110 has completed its course which covers the property 160, the receiver units 20 and the targets 110 are retrieved by the user 150. When the aerial drone 110 flight is complete, the data stored on the receiver units 20 is downloaded and analyzed.

After collecting the targets 110 and the receivers 20, the data contained on the receivers 20 is downloaded to a computer 170 that is running a software solution application 180 designed to interact with the receiver units 20 and provide, in part, PPK processing, including determining where the receiver units 20 were positioned. Using the software solution application 180, the nearest CORS is found and the software solution application 180 connects with the CORS servers to retrieve the overlapping corrections files therefrom. The PPK processing corrects any errors generated from the GPS data collected in the field by the receiver units 20. The software solution application 180 of the present invention provides many advantages over the prior art solutions. Initially, the software solution application 180 allows desktop-based map window view of the project site address, field conditions and mission planning to estimate flight time and required overlaps. After flight, the software solution application 180 collects and manages the data files from the receiver units 20, organizes the files into a project, identifies up to five (5) available CORS files, and collates the data files that can be easily overlayed onto a photo mapping solution such as those known in the art. The present disclosure provides several advantages over the prior art, including:

Dramatically speeding the processing of photogrammetric data collection and reducing the overall costs of the collection process.

Providing a simple and rugged receiver unit 20.

Improving visibility of the targets 100 for airborne cameras based on varying terrain conditions. For instance, on concrete or asphalt surfaces, the orange/black checker is optimum where white/black checker would fade as the camera is at higher altitudes. Conversely, on green grass and similar surfaces, the white/black grid has great contrast to the surrounding environment and is easily registered on the camera, where orange/black colors will fuse and in reflective lighting, disappear in the image.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The term "property" as used herein should not be construed to limit the term to a legally defined area or parcel, but rather more generally to an area of interest to be topographically mapped.

The terms "about" and "approximately" shall generally mean an acceptable degree of error or variation for the quantity measured given the nature or precision of the measurements. Typical, exemplary degrees of error or variation are within 20 percent (%), preferably within 10%, more preferably within 5%, and still more preferably within 1% of a given value or range of values. Numerical quantities given in this description are approximate unless stated otherwise, meaning that the term "about" or "approximately" can be inferred when not expressly stated. As used herein, the singular forms "a", "an" and "the" are intended to include the plural forms as well, unless the context clearly indicates otherwise.

Although particular embodiments of the present disclosure have been described, it is not intended that such references be construed as limitations upon the scope of this disclosure except as set forth in the claims.

We claim:

1. A method of conducting a topographic survey of a property, said method comprising: (i) placing one or more flexible targets above stationary ground about the property, wherein said target comprises a contrasting color pattern comprised of at least two (2) contrasting colors in a checker board pattern; (ii) placing a receiver unit on top of said above ground targets, wherein said receiver unit comprises at least a positioning antenna, a ferrous metal grounding plate and a non-volatile memory to store position data received by the positioning antenna; (iii) operating an aerial drone which takes photographs of the property; (iv) retrieving data from a stationary continuously operating reference station with a known and fixed location (v) performing post-kinematic processing on the stored position data using at least data gathering from the continuously operating reference station and the photographs taken by the aerial drone which determines the position of the one or more flexible targets about the property.

2. The method of claim 1 wherein the post-kinematic processing determines where the receiver unit was positioned.

3. The method of claim 1 wherein the drone flies a grid pattern over the property.

4. The method of claim 1 wherein data is retrieved from more than one continuously operating reference station.

5. The method of claim 1 wherein at least four (4) targets and receivers are used to survey the property.

6. The method of claim 1 wherein the data is retrieved from the continuously operating reference station to the receiver.

7. The method of claim 1 wherein the contrasting color pattern includes orange and black colors.

8. The method of claim 1 further comprising retrieving data from at least three (3) stationary continuously operating reference stations with known and fixed locations.

9. The method of claim 8 further comprising retrieving data from five (5) stationary continuously operating reference stations with known and fixed locations.

* * * * *